United States Patent [19]

Hare et al.

[11] 4,183,107

[45] Jan. 15, 1980

[54] VARIABLE FLUSH TOILET VALVE MECHANISM

[76] Inventors: Nicholas S. Hare, P.O. Box 833; Miles J. Jackson, P.O. Box 67, both of Monroeville, Ala. 36460

[21] Appl. No.: 927,661

[22] Filed: Jul. 24, 1978

[51] Int. Cl.² .......................... E03D 1/14; E03D 3/12
[52] U.S. Cl. .......................................... 4/324; 4/378; 4/415
[58] Field of Search ................ 4/326, 325, 324, 327, 4/415, 379, 378

[56] References Cited

U.S. PATENT DOCUMENTS

| | | | |
|---|---|---|---|
| 1,890,281 | 12/1932 | Dollinger | 4/327 |
| 3,831,204 | 8/1974 | Cook | 4/324 |
| 3,908,203 | 9/1975 | Jackson | 4/324 |
| 4,038,708 | 8/1977 | Perrine et al. | 4/324 |

*Primary Examiner*—Henry K. Artis
*Attorney, Agent, or Firm*—Harold C. Hogencamp

[57] ABSTRACT

A simplified low-cost water conservation valving device comprising a novel improved combination of three easily assembled components which provides an effective means for flushing a toilet. Selectively operative to release, as desired, a predetermined minimum amount of water, a gradually increasing amount, or the full volume of water from a ball-valve type of storage tank to flush the toilet. Easily installed as a water saving replacement for the original ball-valve and stem without use of tools.

5 Claims, 2 Drawing Figures

VARIABLE FLUSH TOILET VALVE MECHANISM

This invention relates to an improved water valving device for use in flush toilets. More specifically my invention relates to a simple combination device for selectively despensing all or only a portion of the water from a ball-valve type of flush tank by operation of a single flush handle.

A related patent, U.S. Pat. No. 3,908,203 to Jackson, discloses a mechanism designed particularly for use with flap-valve types of flush tanks whereas the present invention is for use with ball-types of tanks.

Conservation of energy and natural resources has become of major worldwide importance, particularly so in this country because of the depletion of non-replaceable sources thereof. Needless waste is much to blame for such depletion.

Wastefulness in the use of water in home and business water supply systems also wastes energy, since power is required to pressurize such supply systems. Also, especially in drought areas, such useless waste often causes water shortages.

One place that there is a great waste of water is in the flush toilet. The common type of storage tank holds some four or five gallons of water and the full tankful is normally used each time the toilet is flushed. When solid matter is present all of this water is needed. However, if only liquid is present in the toilet bowl a lesser quantity of water would be sufficient to flush the toilet.

The so-called two-level flush system permits the choice of releasing either the full tankful of water or only a portion thereof when the toilet is flushed, thus effectively saving water (and energy).

In the prior art there are numerous issued patents showing two-level systems. Many were issued long before the present urgency for conservation of energy and natural resources. However, since there appears to be no generic patent of this nature, these prior-art patents are all somewhat similar and relate primarily to variations in structure. Many are of complicated construction and cannot be economically or easily installed as a replacement kit in existing flush-toilet tanks. Apparently, for these and/or other reasons, none are in common use despite the need for water conservation.

By comparison, the novelty of my presently disclosed device lies in its simplicity of structure, economy of manufacture, and particularly in the ease of installation in existing flush toilets as a water conservation means. It is a combination comprised of only three basic components and can be installed by the average householder in a ball-valve type of toilet tank without use of tools.

With the foregoing in mind, the primary object of my invention is to provide an improved valving device for installation in the water storage tank of a ball-valve type of flush toilet as a means for conserving water.

A second object is to provide a simplified, easily installed, low-cost valving device which is selectively operable to release all or only a portion of the water stored in a tank for flushing a toilet.

Other objects will become apparent from the following specification, the accompanying drawing, and the appended claims.

The simplified structure of my device is further exemplified in the accompanying drawing wherein only the essentials for an understanding of the components and the novel combination thereof are shown. Commonly well-known and understood structural details are omitted.

Figure 1:
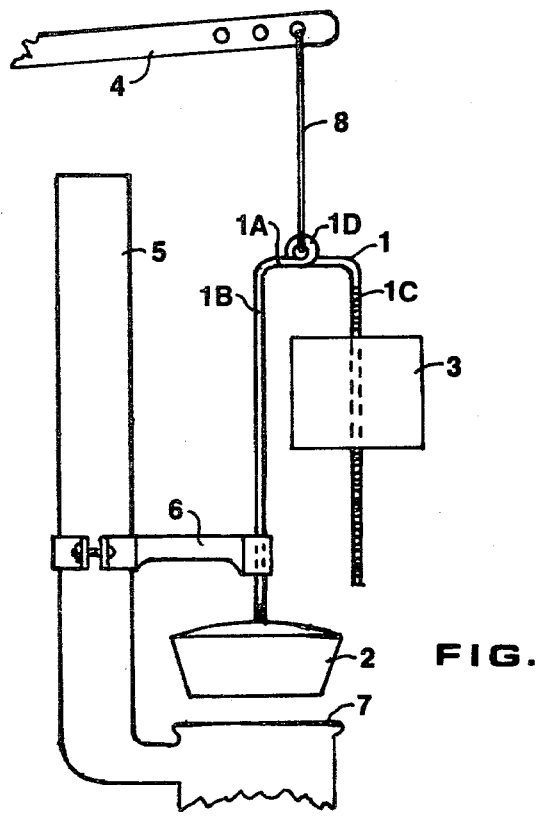
FIG. 1 is a line drawing showing the arrangement of my device in conjunction with related components of a toilet tank which are included only for reference purposes.

In a more detailed description of FIG. 1 it will be seen that there are only three basic components, combined as shown to provide the device of my invention—namely a U-shaped rod 1, a valve-closure member 2, and a float 3.

Related components, already installed as part of the internal structure of the water storage tank, include flush-lift-lever 4 operative by means of an external flush handle (not shown), an overflow standpipe 5, a stem guide bracket 6 firmly attached to said standpipe 5, and a water outlet valve-seat 7.

The component here termed a U-shaped rod 1 is preferably formed of non-corrosive or corrosive-resistant material such as brass or a suitable plastic. It is of circular cross-section and might conveniently be in the form of a hard-drawn brass wire bent into the desired shape, or it could be made of a hard plastic material.

Regardless of the material employed or the means of forming or shaping rod 1, the upper interconnecting portion 1A is substantially flat along its length, is horizontally positioned, and at each end has downwardly-extending vertical legs or stems designated respectively as 1B and 1C. Additionally, as shown in the drawing, an eye or loop 1B, or the like, is formed (as by bending wire-rod 1) atop of horizontal portion 1A for connecting to a lift means such as a wire, a braided nylon cord, or a beaded chain 8 which is attached at its other end to lift-lever 4.

Downwardly-extending leg 1B corresponds in operation to the lifter-stem which is commonly used in flush toilets, acting to lift valve 2 from valve-seat 7. As further indicated in the drawing leg or stem 1B is inserted downwardly through the bore or opening in the guide-arm 6 in the usual manner. Also, similarly to the commonly used lifter-stem, the lower end of leg 1B may be threaded to accomodate valve-closure member 2 as here indicated for convenience, but preferably the lower end of leg 1B terminates in a "ball" 1E by which valve 2 is attached through the use of a "ball-and-socket" connection. This arrangement is better shown in FIG. 2 wherein "ball" 1E is formed as an integral end part of rod 1 and "socket" 9 is formed in member 2.

The other leg 1C which extends downwardly from the horizontal top portion 1A has the purpose of supporting float 3. In order to permit vertical adjustment in the positioning of float 3 upon leg 1C, yet hold it firmly and support it in the desired position, suitable means such as notches, indentations, threads, undulations or the like are provided along the length of leg 1C in order to form a friction alized outer surface thereon. This is indicated in the drawing simply by horizontal crosslines.

Figure 2:
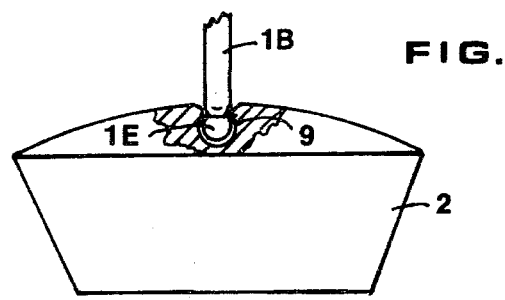
FIG. 2 is an enlarged partially cut-away view showing a preferred variation of one portion of the device shown in FIG. 1.

Valve closure member 2 differs from the commonly used ball valve in that it is solid in structure whereas most ball valves are hollow and have flotation chamber with a bottom opening therein. Further, valve member 2 is made of such material that it has no buoyarcy. It is shaped as shown or in other such manner so that the lower spherical or conical surface will complement valve seat 7 to completely shut off water flow when the valve is seated and the material from which it is formed must be sufficiently resilient to do this. Valve closure member 2 may be threadably affixed to rod or stem portion 1B in the normal way as by use of a female-threaded bore insert centered in its top area; or preferably the valve-closure member 2 is affixed to the rod or stem portion 1B by the "ball and socket" connection as shown in FIG. 2 with the socket 9 being formed in or as a bore inserted in the resilient or rubber like material of member 2. Instead of the valve closure member 2 being in the shape of a ball or cone, it may be a simple rubber disc. The third prime component depicted in the combination of the present invention is float 3 which is particularly interrelated in its structural requirements to the valve member 2 and rod 1. Whereas valve member 2 is of high specific gravity, and nonbuoyant, float 3 is obviously buoyant. It is designed by reason of material (such as styrofoam), size and shape to only partially counterbalance the combined pull-down weight of the non-buoyant valve member 2 and rod 1 attached thereto. Also the fixed but adjustable and frictionally held vertical positioning of float 3 on leg 1C becomes of importance in determining the amount and/or proportion of the total volume of water to be released from the storage tank, as will be further explained. A central bore in float 3 is of much diameter that it tightly fits over the friction-surface of leg 1C but permits the float 3 to be manually moved to the desired vertical position.

Sometimes the U-shaped rod 1 might tend to turn in guide 6 and hit the water-input-valve float. The lifter chain or cord 8 will act to aline the horizontal portion 1A directly under the lifter lever 4 with each operation. If a lift wire is used, it can be employed to keep rod 1 positively alined.

It is obvious that my device can readily be incorporated into the manufacture of new water tanks for flush toilets. However, of even greater immediate importance in the present urgent need for conserving water is the potential use of this device as an easily installed replacement for the usual wasteful ball-valve and lift stem in the many millions of flush toilets already existing and in use. Untold millions of gallons of water could thereby be saved each day.

Here are the simple, easy steps for installing my device as such a replacement in the conventional, already in use, ball-valve toilet tank:

1. Shut off the water supply (as is always necessary when replacing the ball-valve and/or lifter stem, as is at times anyway required).

2. Detach the lift wire or beaded chain from the valve lift stem. Unscrew the original stem from the ball-valve and remove both.

3. Insert end-threaded leg 1B of U-Shaped rod 1 of the present device downwardly through the bore or opening in stemguide bracket 6 (from which the old lift stem has just been removed) and screw the new valve closure member 2 onto the threaded lower end of leg 1B; or insert the "ball" end 1E of leg 1B into the flexible "socket" 9 of valve closure member 2.

4. Attach lift wire, braided nylon cord, or beaded chain 8 to eye or loop 1D atop horizontal portion 1A of U-Shaped rod 1—the other end of lift means 8 being still attached to lift-lever 4.

5. If not already previously so positioned, raise float 3 to its maximum height on the friction surface of leg 1C.

After the device is installed the water supply is turned on and the tank is filled to the level determined by the water-input-valve float, making sure that the output valve is firmly seated and that there is no water output leakage.

If the flush lever (external of tank and not shown in drawing) is then quickly actuated and let go only part of the water contained in the tank will be released into the toilet bowl. (Note: With the float 3 positioned as high up on leg 1C as possible and as directed in the previous installation instructions there may not be even enough water released to flush the toilet.)

By gradually lowering float 3 on leg 1C and quickly actuating the flush lever a larger portion of the water from the tank will be released each time. Move float 3 downwardly until sufficient water is released to produce flushing. Generally about one half of the water content of a full tank proves most acceptable. Of necessity there will of course be some waste of water while float 3 is being so adjusted and properly positioned.

Holding the flush handle open for a slightly longer period of time will permit more water to be released into the toilet bowl and if the flush handle is held open long enough the entire tankful of water will be emptied to provide the usual maximum flush action.

Thus it will be obvious that, depending on needs, a varying amount or proportion of the water stored in the tank can be released to flush the toilet.

Selective operation of my flushing device is therefor simple: By actuating the external flush handle and quickly releasing it, only the pre-set and predetermined minimum amount of water will be discharged from the tank; slightly holding the flush handle after it has been actuated will permit a greater volume of water to be discharged, and increasingly so as the handle is longer held after actuation; when the flush handle is held for a sufficient time (generally for only a few seconds) the full water-content of the tank will be emptied into the toilet bowl to flush the toilet. Contents of the bowl determine the amount of water release or discharge which might be needed to fully and/or satisfactorily flush the toilet and the flush handle can be held accordingly.

Having thus described my invention and the operation thereof it is contemplated that it shall be limited in scope only by the appended claims.

What we claim as new and desire to protect by Letters Patent is:

1. For use in a conventional ball-valve type of water tank for flush toilets which includes therein a flush lift-lever operative by means of a flush handle located external of said tank, an overflow standpipe, a stem-guide bracket firmly attached to said standpipe, and a water outlet valve seat: a selectively variable valving device comprising, in combination: an elongated U-shaped rod of solid circular cross-section and having a substantially flat horizontally positioned top portion interconnecting two downwardly extending vertical leg portions, the first of said legs passing through the bore in said stem-guide bracket and terminating at its lower open end in means for removably attaching a valve-closure member, the second leg being notched, undulated or otherwise provided with a frictionalized outer surface along its length; a solid non-buoyant valve-closure member removably attached directly to said first downwardly extending leg at its lower end; and a buoyant float having a circular central bore extending therethrough complementary in size to the circular cross-section of said rod, movably positioned on said second leg and frictionally supported thereon.

2. The valving device as claimed in claim 1 wherein said valve-closure member is removably attached to the lower open end of said first leg of the U-shaped rod by a ball-and-socket joint.

3. The valving device as claimed in claim 1 wherein said valve-closure member is threadably attached to the lower open end of said first leg of the U-shaped rod.

4. The valving device as set forth in claim 1 including an eye or open loop formed or firmly affixed atop said upper substantially horizontal portion of said U-shaped rod.

5. The valving device according to claim 4 including lift means interconnecting said eye or loop and the flush-lift lever included in said tank structure.

* * * * *